United States Patent
Orlowski

(10) Patent No.: US 6,419,233 B2
(45) Date of Patent: *Jul. 16, 2002

(54) SHAFT SEAL ASSEMBLY

(75) Inventor: David C. Orlowski, Milan, IL (US)

(73) Assignee: Isotech of Illinois, Inc., Rock Island, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/139,499

(22) Filed: Aug. 25, 1998

(51) Int. Cl.$^7$ ................................................ F16J 15/44
(52) U.S. Cl. ...................... 277/411; 277/412; 277/418; 277/419; 277/420
(58) Field of Search .................... 277/411, 412, 277/418, 419, 420, 312

(56) References Cited

U.S. PATENT DOCUMENTS

| | | | | |
|---|---|---|---|---|
| 2,014,859 A | * | 9/1935 | Mitchell, Jr. | 277/420 X |
| 3,602,559 A | * | 8/1971 | Hirschler | 277/420 X |
| 4,466,620 A | * | 8/1984 | Orlowski | 277/420 X |
| 4,484,754 A | * | 11/1984 | Ballard | 277/420 X |
| 4,679,801 A | * | 7/1987 | Poloni | 277/420 X |
| 4,706,968 A | * | 11/1987 | Orlowski | 277/347 |
| 4,743,034 A | * | 5/1988 | Kakabaker et al. | 277/419 X |
| 5,024,451 A | * | 6/1991 | Borowski | 277/347 |
| 5,378,000 A | * | 1/1995 | Orlowski | 277/420 |
| 5,904,356 A | * | 5/1999 | Mundy | 277/418 X |
| 5,967,524 A | * | 10/1999 | Fedorovich | 277/419 X |
| 6,062,568 A | * | 5/2000 | Orlowski et al. | 277/348 |
| 6,234,489 B1 | * | 5/2001 | Orlowski et al. | 277/395 |

* cited by examiner

Primary Examiner—Anthony Knight
Assistant Examiner—Enoch E Peavey
(74) Attorney, Agent, or Firm—Harsha & Associates

(57) ABSTRACT

An improved shaft seal assembly is disclosed having a stator including a main body and axial and radial projections therefrom. The rotor is radially extended and encompasses the axial and radial projections from said stator. The passageway formed between the radial projection of the stator and the rotor results in an axial passageway having its opening facing rearwardly from the rotor and away from the source of impinging coolant and/or contaminant. The dimension of interface gap between the rotor and the radial projection from the stator, which the access to the shaft of any impinging material, is fixed at a predetermined value and does not vary with the relative movement between the rotor and the stator. The novel seal assembly of this invention thus provides improved rejection or warding off of contaminates from ingress into the labyrinths and ultimately restrained from attacking the bearing environment.

14 Claims, 1 Drawing Sheet

SHAFT SEAL ASSEMBLY

BACKGROUND OF THE INVENTION

This invention relates generally to shaft sealing devices for use with rotating equipment. Adequate maintenance of rotating equipment is difficult to obtain because of extreme equipment duty cycles, the lessening of service factors, design and the lack of spare rotating equipment in many processing plants. This is especially true of machine tool spindles, wet end paper machine rolls, aluminum rolling mills and steam quench pumps and other equipment utilizing extreme contamination affecting lubrication.

Various forms of shaft sealing devices have been utilized to try to protect the integrity of the bearing environment, including rubber lip seals, clearance labyrinth seals, and attraction magnetic seals. Lip seals or O-ring shaft seals can quickly wear out and fail and are also known to permit excessive amounts of moisture and other contaminants to immigrate into oil reservoir of the operating equipment even before failure had the interface between the rotor and the stator exposed to the contaminates or lubricants at the radial extremity of the seal.

Labyrinth-type seals involving closely related stator and rotor rings, which do not contact each other but define labyrinth passages between them have been devised and utilized and are illustrated in Orlowski, U.S. Pat. Nos. 4,706,968; 4,989,883; 5,069,461; and the additional patents to Orlowski cited therein. As described in Orlowski U.S. Pat. Nos. 4,989,883 and 5,069,461, improvements in labyrinth seals are disclosed including the utilization of various forms of O-ring seals to improve the static sealing action when the shaft is at rest and non-contact dynamic sealing action is provided when the shaft is rotating.

An improvement over these labyrinth seals and o-ring seals is described in U.S. Pat. No. 5,378,000. There the isolator or seal provides a sealing ring inserted in recesses in the rotor and the stator to lock together the rotor and stator in an axial direction. This actual lock up of rotor and stator dramatically reduces the possibility of migration of rotor from stator. The resultant is a reduced radial interface gap variation from that which had existed previously between the rotor and the stator.

An objective of the present invention is to provide an improvement to seals or bearing isolators to prevent leakage of lubricant and entry of contaminants by encompassing the stator within the rotor to create an axial directed interface at the radial extremity of the rotor. Prior art seals traditionally had the interface between the rotor and the stator exposed radially to the contaminants or lubricants at the radial extremity of the seal.

The projection of an axial portion of the stator into the rotor has been expanded radially. This projection or protruding member of the stator into the rotor has been expanded radially beyond the diameter of the major portion or body of the stator.

The rotor and the resultant recess 22 in the stator, which previously surrounded the stator projection or insertion, is also extended radially beyond the major portion of the stator. The rotor now encompasses the stator, or a substantial portion of the stator radial projection, in such a manner that the interface presented to the ingress of the lubricant or contaminates is facing axially and rearwardly. The axial facing interface presents a limited access to the internal of the seal and a constant dimensional interface between the rotor and the stator regardless of any axial movement of the rotor with respect to the stator.

A groove 23 may be machined into the stator to accentuate the novel radial extension of the rotor and the stator. This groove improves the ability of the seal to prevent contaminates from entering the axial interface gap between the rotor and the stator.

This novel improvement i.e. the encapsulation of the radial extension stator by the rotor enables the interface gap between the accessible portions of the stator and the rotor to be of a predetermined dimension. The improvement also means that there is no fluctuation or variation in the interface gap resulting from any relative axial movement between the rotor and the stator.

This novel seal or bearing isolator will operate to vastly improve the rejection or ingress of contaminants into the interface gap between the rotor and stator. The entrance to the interface gap is facing or directed away from the normal flow of contaminants i.e. along the axis of the shaft toward the housing. The interface gap can be machined to extremely close tolerances because there is no movement radially between the rotor and the stator and any axial movement does not affect the interface.

Other objects, advantages embodiments of the invention will become apparent upon the reading the following detailed description and upon reference to drawings and the prior art patents.

DETAILED DESCRIPTION OF THE PREFERRED EMBODIMENT OF THE INVENTION

Figure 1:
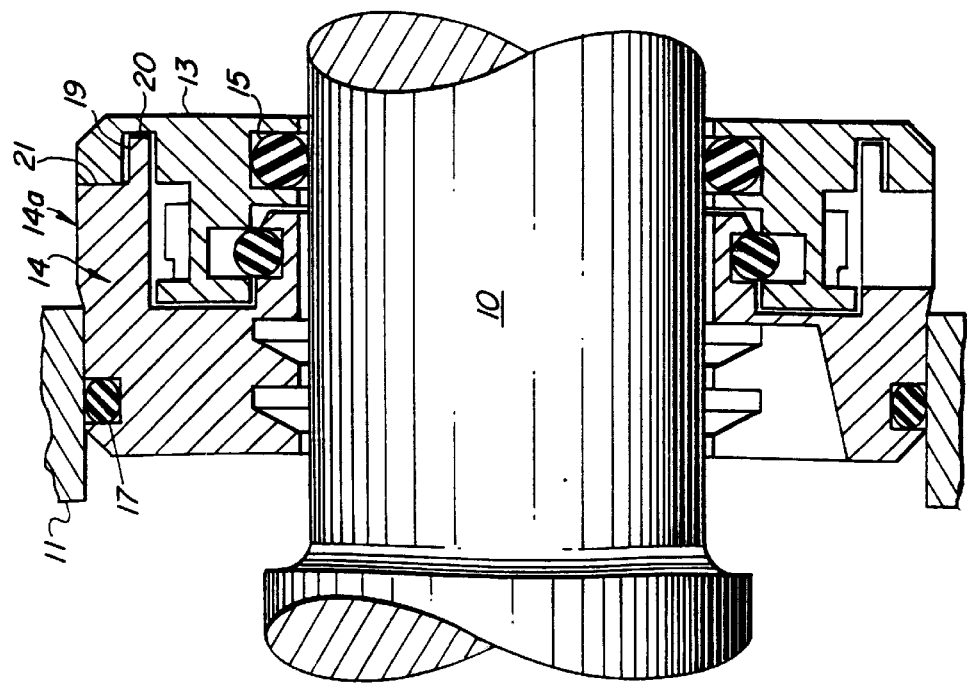
FIG. 1 is a sectional view showing the sealing structure of the prior art with a shaft.

FIG. 1 shows the prior art having the most control over the relative axial movement between rotor and stator. The prior art essentially had the interfacing gap opening radially into the lubrication or contaminant substantially as shown in FIG. 1.

Figure 2:
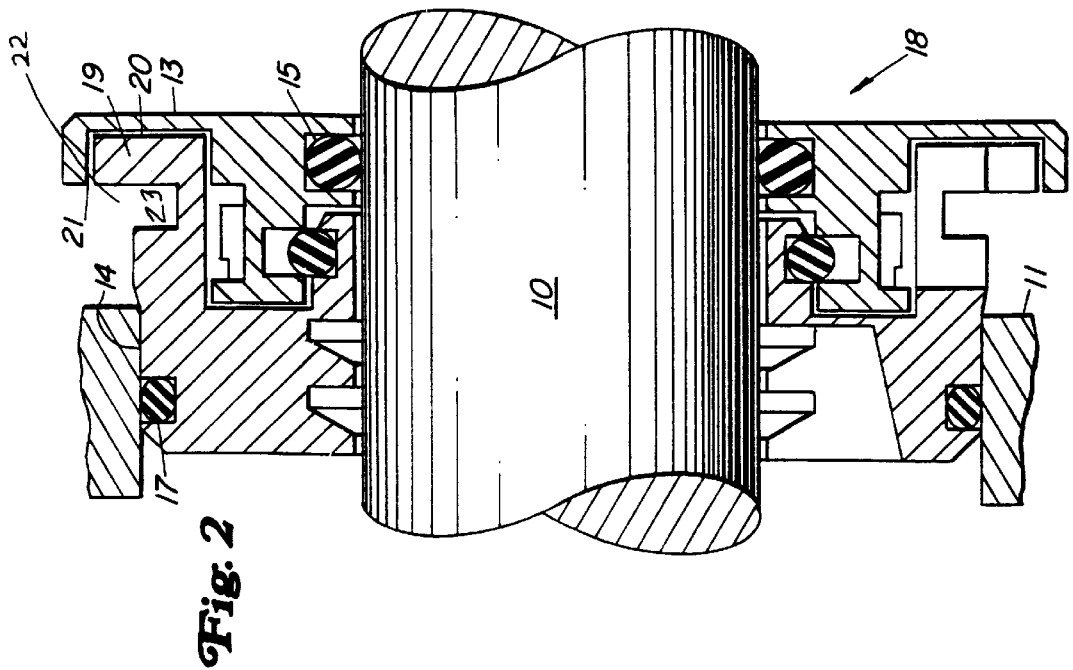
FIG. 2 is a sectional view showing the improved sealing structure of this invention with a shaft.

The novelty of this invention is as shown in FIG. 2 and as described herein. The invention can also be utilized on seals or bearing isolators using only labyrinths as shown in much of the prior art referenced.

It should be noted, as shown in FIG. 2, that the location of the gap with respect to rotor and stator surfaces and the direction of the opening interface gap are both important to this invention.

In FIG. 1, axial movement of the rotor 13 relative to the stator 14, if occuring will change the size of the radial interface gaps 20 and 21. Radial interface gap 21 is also receptive to contaminants, especially in extreme conditions presented to the surfaces 13a and 14a of the rotor 13 and the stator 14 regardless of the dimension of the interface gap 21.

As shown in FIG. 2 this invention extends the rotor 13 radially well beyond the major diameter of the stator 14. This permits the rotor 13 to encompass the also radially extended projection 19 of the stator 14. It is important that this radial extension of the rotor 13 extends beyond the basic radial dimension of stator 14. This requires a departure from the prior art wherein the rotor 13 was radially co-extensive with the major diameter of the stator 14.

The interface gap 21 between the rotor 13 and stator 14 that is exposed to the contamination or lubricants is now fixed in dimension and independent of any relative axial movement between the rotor 13 and the stator 14. The interface gap 20 is still subject to variation in dimension by any relative movement between the rotor 13 and the stator 14. This relative movement is not significant to the operation in as much as only a small amount of contaminates have been able to enter the labyrinth because of size and location of the interface gap. The removal of the interface gap 21 from variations is more important in seals where the stator 13 and the rotor 14 are not restrained from relative movement.

The orientation of the opening of the interface gap of 21 is important regardless of relative movement between the rotor and stator. The interface gap 21 being axially oriented to control entrance of contaminates is novel and important. The opening of the interface gap 21 is now facing rearwardly toward the housing and away from the contaminates stream. The contaminate or cooling stream will normally be directed along the axis of the shaft 10 and toward the housing 11.

A groove 23 may be cut in stator 14. This groove 22 enhances and accentuates the benefits of the radial extension of the rotor 13 and the stator 14 with the resultant orientation and independence of interface gap 21.

This seal may be made from any machinable metal such as bronze or stainless steel or machineable plastics such as Teflon® or other machinable plastics.

Variations and other aspects of the preferred embodiment will occur to those versed in the art all without departure from the spirit and scope of the invention.

What is claimed:

1. A labyrinth type seal for sealing a rotating shaft entering a housing comprising:
   a. a housing;
   b. a stator surrounding a shaft and affixed to the housing, said stator having a main body and projections extending both axially and radially beyond said main body, said radial projections being greater than said axial projection;
   c. a rotor surrounding said shaft and rotatively connected to said shaft; said rotor having a main body and projections extending both radially and axially;
   d. said rotor and said stator abutted and intermeshed with each other on said shaft
   e. said rotor radial projections extending radially outwardly farther than any radial projections of said stator.

2. A seal accordance to claim 1 wherein the radial space between said radial rotor projections and said radial stator projections forms a first axial passage.

3. A seal accordance to claim 2, wherein said first passageway includes a first axial passage opening to a space in said stator and facing the body of the stator between said housing and the radial extensions of the rotor and stator.

4. A seal in accordance with claim 3, wherein said dimension of said axial passage is constant.

5. A seal in accordance with claim 4, wherein the dimension of said axial passage is predetermined.

6. A seal in accordance with claim 3, wherein said opening of said axial passage faces away from injected coolant, said rotor projection and towards said housing.

7. A seal accordance with claim 2, wherein said main body of said stator surrounds a portion of said rotor.

8. A seal accordance with claim 2, wherein the radius of the radial internal surface of the rotor radial projection encompassing said stator is greater than the radius of the exterior surface of said radial projection of said stator.

9. A seal in accordance with claim 1, wherein there is at least one labyrinth formed between the main body of said stator and the main body of said rotor.

10. A seal in accordance with claim 1, wherein said rotor and said stator are restrained from relative axial movement between each other.

11. A seal in accordance with claim 1, wherein a groove is formed in said main body of said stator, said groove augmenting the radial extension of said radial projection from said stator.

12. A method of sealing a shaft exiting a housing, the method comprising:
   a) fixing a stator having a main body and a projection extending both radially and axially beyond the main body of said stator concentrically about the shaft; the radial projections being greater than the axial projection;
   b) mounting a rotor sealed on the shaft in close relation to the housing for rotation with the shaft and providing the rotor with radial projections extending radially outwardly farther than any radial projections of said stator
   c) the rotor encompassing the radial extremity of the radial projection of the stator and having overlapping radially spaced surfaces forming an axial passage between the surfaces of the rotor and the stator projections;
   d) the opening of said axial passage faced away from said rotor and toward the body of said stator.

13. The method of claim 12 including at least one labyrinth between the rotor and main body of the stator.

14. The method of claim 13, including the steps of connecting the stator to the rotor to prevent relative axial movement between the stator and the rotor.

* * * * *